Patented Nov. 16, 1937

2,098,954

UNITED STATES PATENT OFFICE 2,098,954

HYDROURACIL COMPOUNDS AND PROCESSES FOR THEIR PRODUCTION

Otto Dalmer, Claus Diehl, and Hartmann Pieper, Darmstadt, Germany, assignors to Merck & Co. Inc., Rahway, N. J., a corporation of New Jersey No Drawing. Application January 3, 1934, Serial No. 705,130. In Germany January 3, 1933

24 Claims. (Cl. 260—32)

This invention relates to new hydrouracil compounds and their manufacture and has for its main object to provide for new and useful soporifics or narcotics.

Soporifics consisting of or containing compounds of the heterocyclic series with an amide-like structure are known. The most important of these compounds are the barbituric acids, substituted by two hydrocarbon residues in the 5-position, and their derivatives obtained by N-alkylation. Also disubstituted hydantoin compounds have been employed as soporifics.

We have found a principally new class of soporifics in hydrouracil compounds of the general formula

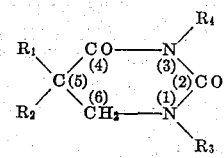

in which $R_1$ and $R_2$ are aliphatic, alicyclic or aromatic hydrocarbon residues and $R_3$ and $R_4$ either hydrogen or hydrocarbon residues. Whereas the known hydrouracil itself and its substitution products, obtained by monoalkylation in the 5- or 6-position are indifferent substances, we have found, that hydrouracils, substituted by two hydrocarbon residues in the 5-position, are strong and effective soporifics, which is also the case with their derivatives, obtained by substitution in the 1- or 3-position. Generally speaking the products substituted at the nitrogen atom have from physical and pharmacological aspects certain advantages over the products substituted only at the carbon atom.

The new class of soporifics has representatives similar to the diethylbarbituric acid with respect to their soporific action, but with a greater therapeutic scope. Of still more importance for the new soporifics is the fact that certain of them have a high solubility, which is a great advantage over soporifics of the barbituric acid group and over most of the known soporifics. The 5.5-diethyl-1-methylhydrouracil for example has a solubility in water, which is 12 times as high as the solubility of diethylbarbituric acid. Very good pharmacological results are also obtained with 5.5-diethyl-hydrouracil and its derivative, obtained by methyl substitution at the nitrogen atom 3 and with products having higher hydrocarbon residues as substituents such as 5-ethyl-5-butylhydrouracil and 5-ethyl-5-isoamylhydrouracil.

The new compounds belonging to the new class of soporifics are obtained by first reacting esters or amides of β-aminopropionic acid, being disubstituted by hydrocarbon radicals in α-position to the carboxyl group and having at least one hydrogen atom in the amino and amido group, with derivatives of carbonic or cyanic acid. Ureido or urethano compounds are thus obtained, which are converted by ring formation into the respective hydrouracil derivatives by treatment with condensing agents. Especially suitable condensing agents are the alkali metal alcoholates, especially sodium ethylate. Also other condensing agents usual for ring formation in the barbituric acid series, such as sodium amide, may however be employed.

Also those methods leading to hydrouracil derivatives from aminopropionic acid derivatives by one step are suitable for the manufacture of the new products. Thus for example are hydrouracil derivatives directly obtained by treating amides of β-aminopropionic acid, disubstituted by hydrocarbon residues in α-position to the carboxyl group and having at least one hydrogen atom in the amino and amido group, with esters of carbonic acid in presence of condensing agents mentioned above. These reactions may be illustrated by the following formula:

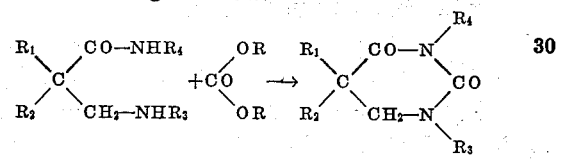

For the manufacture of the derivatives obtained by methyl substitution at nitrogen atom 3 is especially suitable the methyl amide of β-aminopropionic acid substituted by two hydrocarbon residues in α-position to the carboxyl group. The preferred ester of carbonic acid for the reaction described is the ethyl ester, which may easily be obtained.

As already explained above there are two main ways to obtain hydrouracil derivatives from the derivatives of aminopropionic acid. These ways go over the ureido compounds in one case and over the urethano compounds in the other case.

In the first case esters of β-aminopropionic acid, disubstituted by hydrocarbon residues in α-position to the carboxyl group and having at least one hydrogen atom in the amino group, are the starting materials, in which the amino group is converted into the ureido group according to known methods. The best known method for this purpose comprises the employment of potassium or other cyanates (Berichte der Deutschen Chemischen Gesellschaft, vol. 33 (1900), page 3418; Annalen der Chemie, vol. 327 (1903), page 366). Decompositions with urea, eventually in presence of baryta water, and with guanidine are described in Berichte der Deutschen Chemischen Gesellschaft, vol. 39 (1906), page 2953, vol. 41 (1908), pages 2953, 2974 and 2977. Other methods for the purpose in question are the reaction of carbamic acid chlorides with esters of amino acids (Annalen der Chemie, vol. 244 (1888), page 34) and the old method of Wurtz (c. r. vol. 32 (1851), page 414) for reacting amino compounds with esters of isocyanic acid.

The ureido compounds obtained are treated with condensing agents to effect ring formation, thus obtaining the corresponding hydrouracil derivatives

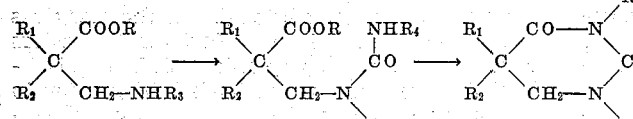

Starting materials especially suitable for the synthesis just described are the substitution derivatives of the ethyl ester of aminopropionic acid. The preferred method to obtain their ureido compounds is their treatment with cyanates. Suitable cyanates are the alkali metal cyanates, especially potassium cyanate, and the esters of cyanic acid, such as methyl isocyanate.

In the second case amides of β-aminopropionic acid, disubstituted by hydrocarbon residues in α-position to the carboxyl group and having at least one hydrogen atom in the amino and amido group, are the starting materials. Substituted methyl amides of aminopropionic acid are especially suitable starting materials. Their amino group is converted by known methods into the urethano group, a treatment with chlorinated esters of carbonic acid, such as the ethyl ester, being especially suitable for this purpose. By further treatment of the urethano compounds with the above described condensing agents ring formation takes place, thus obtaining the corresponding hydrouracil compounds.

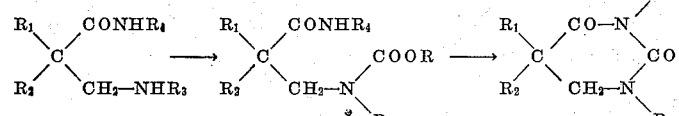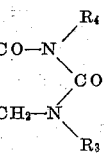

A known method for making urethano compounds is for example the subsequent reaction of phosgene and alcohols with the amino compounds (Annalen der Chemie, vol. 244 (1888) pp. 34 and 35). The employment of chlorinated esters of carbonic acid is completely described in Journal für prakt. Chemie, 2. series, vol. 21 (1880), p. 124. The substitution derivatives of β-aminopropionic acid necessary for this synthesis are obtained by reducing esters or amides of cyanoacetic acid, disubstituted by two hydrocarbon residues, with hydrogen in presence of catalysts, especially noble metal catalysts.

Examples (1) 105 g. of the hydrochloride of the ethyl ester of β-amino-α-diethylpropionic acid, obtained by catalytic reduction of the ethyl ester of diethylcyanoacetic acid, are dissolved in 200 ccm. of water and a solution of 41 g. of potassium cyanate in 100 ccm. of water is added. The mixture is heated to about 50° C. for some minutes. The ethyl ester of β-ureido-α-diethylpropionic acid precipitates as a colorless oil, which soon solidifies by crystallization. The ester melts at 105–106° C., is nearly insoluble in water but easily soluble in most of the organic solvents.

A solution of sodium ethylate, made from 12 g. sodium in 200 ccm. of absolute ethyl alcohol, is added to 108 g. of the above ureido compound, which is easily dissolved. The solution solidifies on heating it to about 70° C. yielding a white crystalline mass. The reaction is finished by short heating under reflux. The alcohol is distilled off at reduced pressure and the remaining sodium salt of 5-diethyl-hydrouracil is dissolved in water; the solution is neutralized with acid. The 5-diethylhydrouracil, which precipitates, is purified by recrystallization with alcohol. The condensation may also be effected with the same good result by using a solution of sodium in other alcohols instead of sodium ethylate.

(2) 56.1 g. of the ethyl ester of β-methyl-amino-α-diethylpropionic acid, boiling at 94° C. under a pressure of 13 mm. Hg and obtained by partial methylation of the ethyl ester of β-amino-α-diethylpropionic acid, are exactly neutralized with a mixture of 25.2 ccm. of aqueous 37% hydrochloric acid and 150 ccm. of water and treated in the same manner as described in Example 1 with a solution of 25 g. of potassium cyanate in little water. The ureido ester obtained melts at 78° C.

46 g. of the ureido ester are boiled for about two hours and a half under reflux with a solution of 4.6 g. of sodium in 120 ccm. of alcohol. The mixture is cooled and neutralized with hydrochloric acid. The alcohol is distilled off under reduced pressure, and the residue is dissolved in water and ether. On concentrating the etherical solution 1-methyl-5-diethylhydrouracil precipitates in the form of colorless prisms melting at 103°, soluble in water and easily soluble in nearly all organic solvents.

(3) 25 g. of the hydrochloride of the methylamide of β-amino-α-diethylpropionic acid, melting at 148° C. and obtained by catalytic reduction of the methylamide of diethylcyanoacetic acid are dissolved in 100 ccm. of water. 150 ccm. of ether are added and while turbinating and cooling 30 ccm. of 33% sodium hydroxide solution and 17 g. of the ethyl ester of chloroformic acid are run into the mixture. The ether is separated and the solution is dried with potassium carbonate. After distilling off a viscous water white syrup remains, consisting of the methylamide of β-carbethoxyamino-α-diethylpropionic acid, which is dissolved in 50 ccm. of absolute alcohol. To the solution is added a solution of 2.9 g. of sodium in 50 ccm. of absolute alcohol, the mixture being then boiled on a water bath under reflux for about two hours. The alcohol is distilled off at reduced pressure and ether and diluted hydrochloric acid are added to the residue. On concentrating the etherical solution 3-methyl-5-diethylhydrouracil crystallizes out in thin colorless needles, melting at 88°, soluble in water and easily soluble in nearly all organic solvents.

(4) 173 g. of the ethyl ester of β-amino-α-diethylpropionic acid are dissolved in one liter of ether. A solution of 58 g. of methylisocyanate in 500 ccm. of ether is dropped in while cooling. The reaction takes place immediately with strong evolution of heat. On distilling off the ether the ethyl ester of β-N'-methylureido-α-diethylpropionic acid crystallizes in the form of long rays, melting at 54° C. The yield is quantitative.

20 g. of the ureido ester are heated with a solution of 23 g. of sodium in 400 ccm. of absolute alcohol for about three hours in an autoclave to about 110-115° C. The alcoholic solution is exactly neutralized with concentrated hydrochloric acid and the alcohol is distilled off at reduced pressure. The residue is taken up with water and ether. On concentrating the solution 3-methyl-5-diethylhydrouracil crystallizes out.

(5) Liquid ethylamide of β-amino-α-diethylpropionic acid is prepared in the same manner as described in Example 3 from the ethylamide of diethylcyano-acetic acid, melting at 71° and obtained from diethylcyanoacetylchloride and aqueous solution of ethylamine.

172 g. of this amide are dissolved in 300 ccm. of ether and provided with a lower layer of 45 g. of sodium hydroxide dissolved in water. While cooling and turbinating 110 g. of the ethyl ester of chloroformic acid are dropped in. The etherical solution is separated and the residue is dried with potassium carbonate, whereupon the ether is distilled off. The viscous colorless residue is the ethyl amide of β-carbethoxyamino-α-diethylpropionic acid, which is for about 2 hours boiled under reflux on a water bath with a solution of 23 g. of sodium in 400 ccm. of absolute alcohol. The alcohol is distilled off and the residue is dissolved in ether and the necessary amount of hydrochloric acid. On concentrating the etherical solution 3-ethyl-5-diethylhydrouracil crystallizes out in thick colorless prisms melting at 74° C.

(6) 197 g. of the ethyl ester of ethyl-n-butylcyanoacetic acid, boiling at 123-125° C. at 14 mm. Hg, are dissolved in 1000 ccm. of alcohol; 100 ccm. of 37% hydrochloric acid are added. The mixture is shaken for about one hour with molecular hydrogen in presence of platinum oxide at 70-75° and at 40 atmospheres pressure. The alcohol is distilled off, a small amount of non-hydrogenated ester is removed by extraction with ether and an excess of sodium hydroxide solution is added to the aqueous extraction residue. The ethyl ester of β-amino-α-ethyl-α-butylpropionic acid precipitates, is taken up with ether and dried with potassium hydroxide. After distilling off the ether the ester distills over at 118-121° (14 mm.) as a colorless oil.

200 g. of that ester are exactly neutralized while cooling by a mixture of 84 ccm. of 37% hydrochloric acid with 200 ccm. of water and a concentrated aqueous solution of 85 g. of potassium cyanate is added. The reaction mixture gets warm and the ethyl ester of β-ureido-α-ethyl-α-butylpropionic acid soon precipitates as oil which solidifies. The solid product melts at 111° C.

244 g. of that β-ureidoester are boiled under reflux for about one hour with a solution of 23 g. of sodium in 400 ccm. of alcohol. The alcohol is distilled off, water is added to the residue and the mixture is faintly acidified with diluted hydrochloric acid. 5-ethyl-5-butyl-hydrouracil precipitates and is recrystallized with alcohol. The product consists of very fine white needles, arranged in form of a snow flake, melting at 185°, easily soluble in hot alcohol and slightly soluble in water, ether and most of the other organic solvents.

(7) 109 g. of the ethyl ester of ethylphenylcyanoacetic acid are dissolved in 800 ccm. of alcohol. 50 ccm. of 37% hydrochloric acid are added and the mixture is hydrogenated in presence of platinum oxide at 75° C. and 40 atmospheres pressure. After about 45 minutes hydrogenation the alcohol is distilled off, the residue dissolved in water and the solution extracted with petrol ether to remove non-hydrogenated ester. On addition of sodium hydroxide to the aqueous extraction residue the ethyl ester of β-amino-α-ethyl-α-phenylpropionic acid separates. The ester is taken up with ether and dried with potassium hydroxide. After evaporation of the ether the ester distills over at 150-151° (11 mm. Hg). The ester is converted into the ester of β-methylamino-α-ethyl-α-phenylpropionic acid by cautious methylation, said product boiling at 154° (12 mm. Hg).

235 g. of said ester are exactly neutralized with 500 ccm. of twice normal hydrochloric acid, a concentrated aqueous solution of 85 g. of potassium cyanate is added and the mixture is heated to about 50° C. for a short time. The corresponding ureidoester separates in form of an oil, which soon solidifies. Melting point 106-107° C. By boiling the ester for about one hour with a solution of 23 g. of sodium in 400 ccm. of alcohol 1-methyl-5-ethyl-5-phenylhydrouracil is formed. The alcohol is distilled off and the residue neutralized with diluted hydrochloric acid. Small white crystals precipitate, melting at 184.5° after recrystallization with alcohol, difficultly soluble in water and ether and easily soluble in warm alcohol.

(8) 174 g. of the methylamide of phenylcyanoacetic acid, obtained by dissolving the ethyl ester of phenylcyanoacetic acid in aqueous solution of methylamine, and sucking off the methylamide crystallized after some hours and melting at 102° C., are dissolved in 400 ccm. of absolute alcohol and reacted in the usual manner with 115 g. of ethylbromide and a solution of 23 g. of sodium in 400 ccm. of absolute alcohol. The alcohol is distilled off and the methylamide of ethylphenylcyanoacetic acid obtained is recrystallized with ether, yielding colorless needles melting at 73° C.

200 g. of this methylamide are dissolved in 2 l. of alcohol, 100 ccm. of 37% hydrochloric acid are added and the mixture is treated with molecular hydrogen in presence of platinum oxide. When about the theoretical amount of hydrogen is taken up hydrogenation is stopped and the alcohol distilled off. The remaining syrupy hydrochloride of the methylamide of β-amino-α-ethyl-α-phenylpropionic acid, containing only small amounts of unreacted starting material, is decomposed with sodium hydroxide solution and the free base obtained is dissolved in ether, the etherical solution being dried with potassium carbonate. The methylamide formed by hydrogenation is precipitated as ether insoluble sulfate from its solution by addition of a solution of concentrated sulfuric acid in cold ether and thus separated from the non-hydrogenated starting material. The hydrochloride is easily soluble in ether and therefore not suitable for the separation. The methylamide of β-amino-α-ethyl-α-phenyl-propionic acid made from the sulfate is a colorless viscous oil. Yield 195 g.

103 g. of this methylamide are dissolved in 250 ccm. of ether. A solution of 20 g. of sodium hydroxide in 200 ccm. of water and 55 g. of the ethyl ester of chloroformic acid are added while cooling. The ether is separated, the solution dried with potassium carbonate and distilled. The methylamide of β-carbethoxyamino-α-ethyl-α-phenyl-propionic acid remains as viscous colorless syrup. The yield is quantitative. This syrup is for about 2 hours boiled under reflux with a solution of 12 g. of sodium in 250 ccm. of absolute alcohol. The alcohol is distilled off at reduced pressure and ether and diluted hydrochloric acid are added to the residue. On concentrating the etherical solution 3-methyl-5-ethyl-5-phenylhydrouracil crystallizes out in form of colorless prisms, melting at 136° C.

(9) 28 g. of the amide of β-amino-α-diethylpropionic acid and 25 g. of diethylcarbonate are for about 2 hours boiled under reflux with a solution of 4.6 g. of sodium in 100 ccm. of absolute alcohol. The alcohol is distilled off at reduced pressure and the residue is taken up with water, neutralized with diluted hydrochloric acid. 5-diethylhydrouracil with the same properties as the product of Example 1 is obtained in good yield by separating it from the solution.

(10) 31 g. of the methylamide of β-amino-α-diethylpropionic acid and 25 g. of diethyl carbonate are boiled under reflux for about 3 hours with a solution of 4.8 g. of sodium in 100 ccm. of absolute alcohol. The alcohol is distilled off at reduced pressure; the residue is dissolved in water and ether and neutralized with diluted acid. On concentrating the etherical solution 3-methyl-5-diethylhydrouracil is obtained, the same product as in Example 3.

(11) A solution of 43 g. of the ethyl ester of β-ureido-α-diethylpropionic acid in 500 ccm. of benzene is boiled for some hours under reflux with 9 g. of finely powdered sodium amide. The benzene is distilled off, the residue taken up with water and neutralized with hydrochloric acid. The 5-diethylhydrouracil is sucked off, its properties being the same as those of the product of Example 1.

We claim:—

1. A method for making compounds of the hydrouracil series which consists in treating salts of alkyl esters of β-aminopropionic acid, disubstituted by lower alkyl radicals in α-position to the carboxyl group and having at least one hydrogen atom in the amino group, with alkali metal cyanates and treating the ureido compounds thus obtained with alkaline condensing agents to obtain hydrouracil compounds by ring formation.

2. A method for making compounds of the hydrouracil series which consists in treating salt of ethyl ester of β-aminopropionic acid, disubstituted by lower alkyl radicals in α-position to the carboxyl group and having at least one hydrogen atom in the amino group, with alkali metal cyanates and treating the ureido compounds thus obtained with alkaline condensing agents to obtain hydrouracil compounds by ring formation.

3. A method for making compounds of the hydrouracil series which consists in treating salts of alkyl esters of β-aminopropionic acid, disubstituted by lower alkyl radicals in α-position to the carboxyl group and having at least one hydrogen atom in the amino group, with alkali metal cyanates and treating the ureido compounds thus obtained with alkali metal alcoholates to obtain hydrouracil compounds by ring formation.

4. A method for making compounds of the hydrouracil series which consists in treating salts of ethyl ester of β-aminopropionic acid, disubstituted by lower alkyl radicals in α-position to the carboxyl group and having at least one hydrogen atom in the amino group, with alkali metal cyanates and treating the ureido compounds thus obtained with alkali metal alcoholates to obtain hydrouracil compounds by ring formation.

5. A method for making compounds of the hydrouracil series which consists in treating salts of alkyl esters of β-aminopropionic acid, disubstituted by lower alkyl radicals in α-position to the carboxyl group and having at least one hydrogen atom in the amino group, with alkali metal cyanates and treating the ureido compounds thus obtained with sodium alcoholate to obtain hydrouracil compounds by ring formation.

6. A method for making 5.5-diethylhydrouracil which consists in treating the hydrochloride of the ethyl ester of α, α-diethyl-β-aminopropionic acid with potassium cyanate and converting the ethyl ester of α, α-diethyl-β-ureidopropionic acid obtained into 5.5-diethylhydrouracil by condensation with sodium ethylate as condensing agent.

7. A method for making a compound from the hydrouracil series which consists in treating the hydrochloride of the ethyl ester of α, α-diethyl-β-methylaminopropionic acid with potassium cyanate and converting the ureido compound obtained into 5.5-diethyl-1-methylhydrouracil by condensation treatment with sodium ethylate.

8. A hydrouracil compound having the general formula

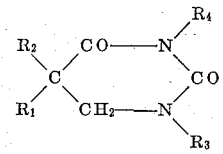

in which $R_1$ and $R_2$ are lower alkyl radicals, and $R_3$ and $R_4$ are selected from the group consisting of hydrogen and lower alkyl radicals.

9. A hydrouracil compound having the general formula

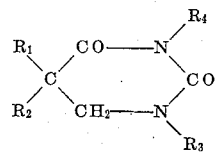

in which $R_1$ and $R_2$ are lower alkyl radicals, and $R_3$ and $R_4$ are selected from the group consisting of hydrogen and lower alkyl radicals, at least one of $R_3$ and $R_4$ being hydrogen.

10. A hydrouracil compound having the general formula

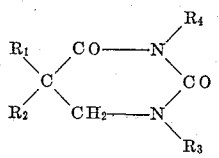

in which $R_1$, $R_2$ and $R_3$ are lower alkyl radicals and $R_4$ is hydrogen.

11. A hydrouracil compound having the general formula

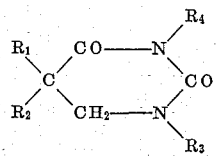

in which $R_1$, $R_2$ and $R_4$ are lower alkyl radicals and $R_3$ is hydrogen.

12. 5.5-diethylhydrouracil, having somniferic action.

13. 5.5 - diethyl - 3 - methylhydrouracil having somniferic action.

14. 5.5 - diethyl - 1 - methylhydrouracil having somniferic action.

15. The step of treating a substance selected from the group consisting of ureido derivatives of alkyl esters of β-aminopropionic acid di-substituted by lower alkyl radicals in α-position to the carboxyl group, and having at least 1 hydrogen atom in the amino group; and urethano derivatives of amides of β-aminopropionic acid di-substituted by lower alkyl radicals in α-position to the carboxyl group and having at least one hydrogen atom in the amino and amido groups, with alkaline condensing agents to obtain hydrouracil compounds by ring formation.

16. A method for making a compound from the hydrouracil series which comprises treating the hydrochloride of the methyl amide of β-amino-α-diethyl propionic acid with the ethyl ester of chlorocarbonic acid, and converting the resulting methyl amide of β-carbethoxy-amino-α-diethylpropionic acid into 3-methyl-5-diethyl-hydrouracil by condensation with sodium alcoholate.

17. A method for making compounds of the hydrouracil series, which comprises treating amides of β-amino-propionic acid, disubstituted by lower alkyl radicals in α-position to the carboxyl group, and having at least one hydrogen atom in the amino and amido groups, with esters of chlorocarbonic acid, and treating the urethano compounds thus obtained with alkaline condensing agents to obtain hydrouracil compounds by ring formation.

18. A method for making compounds of the hydrouracil series which comprises treating amides of β-aminopropionic acid disubstituted by lower alkyl radicals in α-position to the carboxyl group, and having at least one hydrogen atom in the amino and amido groups, with ethyl esters of chlorocarbonic acid, and treating the urethano compounds thus obtained by ring formation.

19. A method for making compounds of the hydrouracil series, which comprises treating amides of β-aminopropionic acid, disubstituted by lower alkyl radicals in α-position to the carboxyl group, and having at least one hydrogen atom in the amino group, with esters of chlorocarbonic acid, and treating the urethano compounds thus obtained with alkaline condensing agents to obtain hydrouracil compounds by ring formation.

20. A method for making compounds of the hydrouracil series, which comprises treating amides of β-amino-propionic acid, disubstituted by lower alkyl radicals in α-position to the carboxyl group, and having at least one hydrogen atom in the amino and amido groups, with esters of chlorocarbonic acid, and treating the urethano compounds thus obtained with an alkali metal alcoholate to obtain hydrouracil compounds by ring formation.

21. A method for making compounds of the hydrouracil series, which comprises treating amides of β-amino-propionic acid, disubstituted by lower alkyl radicals in α-position to the carboxyl group, and having at least one hydrogen atom in the amino and amido groups, with esters of chlorocarbonic acid, and treating the urethano compounds thus obtained with sodium ethylate to obtain hydrouracil compounds by ring formation.

22. A method for making compounds of the hydrouracil series which comprises treating methyl amides of β-aminopropionic acid disubstituted by lower alkyl radicals in α-position to the carboxyl group, and having at least one hydrogen atom in the amino and amido groups, with esters of chlorocarbonic acid, and treating the urethano compounds thus obtained with alkaline condensing agents to obtain hydrouracil compounds by ring formation.

23. A method for making compounds of the hydrouracil series which comprises treating methyl amides of β-aminopropionic acid disubstituted by lower alkyl radicals in α-position to the carboxyl group, and having at least one hydrogen in the amino group, with ethyl esters of chlorocarbonic acid, and treating the urethano compounds thus obtained with alkaline condensing agents to obtain hydrouracil compounds by the ring formation.

24. A method for making compounds of the hydrouracil series which comprises treating methyl amides of β-aminopropionic acid disubstituted by lower alkyl radicals in α-position to the carboxyl group, and having at least one hydrogen in the amino group, with ethyl esters of chlorocarbonic acid, and treating the urethano compounds thus obtained with sodium ethylate to obtain hydrouracil compounds by ring formation.

OTTO DALMER.
CLAUS DIEHL.
HARTMANN PIEPER.

DISCLAIMER 2,098,954.—*Otto Dalmer*, *Claus Diehl*, and *Hartmann Pieper*, Darmstadt, Germany. HYDROURACIL COMPOUNDS AND PROCESSES FOR THEIR PRODUCTION. Patent dated November 16, 1937. Disclaimer filed April 11, 1938, by the patentees; the assignee, *Merck & Co., Inc.*, concurring.

Hereby enter this disclaimer to that part of claim 18 in said specification relating to processes for the conversion of urethano compounds to hydrouracil compounds except those processes in which the urethano compounds are treated with alkaline condensing agents to obtain hydrouracils by ring formation.

[*Official Gazette May 10, 1938.*]